United States Patent
Lepage et al.

(10) Patent No.: US 7,770,235 B2
(45) Date of Patent: Aug. 10, 2010

(54) WATERPROOF BREATHABLE FISHING WADER

(75) Inventors: James B. Lepage, Arlington, VT (US);
Megan E. Babcock, Manchester Center, VT (US); Michael S. Quartararo, Manchester Center, VT (US)

(73) Assignee: The Orvis Company, Inc., Sunderland, VT (US)

( * ) Notice: Subject to any disclaimer, the term of this patent is extended or adjusted under 35 U.S.C. 154(b) by 0 days.

(21) Appl. No.: 12/123,034

(22) Filed: May 19, 2008

(65) Prior Publication Data

US 2009/0282602 A1 Nov. 19, 2009

(51) Int. Cl.
*A41D 13/12* (2006.01)
*A41D 27/24* (2006.01)

(52) U.S. Cl. ............................... 2/82; 2/275
(58) Field of Classification Search ................ 2/275, 2/2.15, 69, 456–458, 2.11, 2.14, 79, 227, 2/2.16, 85, 93, 108, 82, 274, DIG. 5; 112/418; 156/91, 93, 73.5, 308.4
See application file for complete search history.

(56) References Cited

U.S. PATENT DOCUMENTS

| | | | | |
|---|---|---|---|---|
| 3,026,225 A | * | 3/1962 | Ostby, Jr. ................ 428/57 |
| 4,622,908 A | * | 11/1986 | Tranberg ............... 112/475.08 |
| 4,803,109 A | * | 2/1989 | Saniscalchi ............ 428/104 |
| 5,022,096 A | | 6/1991 | Pacanowsky |
| 5,308,689 A | | 5/1994 | Shinkai et al. |
| RE34,662 E | | 7/1994 | Keller |
| 5,458,516 A | * | 10/1995 | Uglene et al. ........... 441/104 |
| 5,655,226 A | | 8/1997 | Williams |
| 5,732,413 A | * | 3/1998 | Williams ................. 2/169 |
| 5,766,400 A | * | 6/1998 | Gallagher, Jr. ........... 156/251 |
| 5,901,374 A | * | 5/1999 | Foster ..................... 2/82 |
| 6,154,884 A | * | 12/2000 | Dehner .................... 2/69 |
| 6,237,152 B1 | * | 5/2001 | Gootrad ................... 2/87 |
| 6,280,807 B1 | * | 8/2001 | Shih ...................... 428/57 |
| 6,375,770 B1 | * | 4/2002 | Meltzer et al. ........... 156/73.4 |
| 6,415,449 B2 | * | 7/2002 | Duplock .................. 2/275 |
| 6,662,377 B2 | * | 12/2003 | Williams ................. 2/239 |
| 6,807,683 B2 | * | 10/2004 | Williams ................. 2/239 |
| 6,961,964 B2 | | 11/2005 | Blenkarn |

OTHER PUBLICATIONS

Stitches, Seams, and Stitchings- The Federal Standard; FED.STD> No. 751a- Jan. 25, 1965; General Services Administration, Business Service Center, Washington, DC 20407. Seam type FSe-1 and Seam TYpe FSd-3. Showing butted edges of two plies of material and seaming a reinforcing tape over or under the seam.*
Orvis Spring 2008 Fly Fishing Catalog, cover and pp. 66-75.

* cited by examiner

*Primary Examiner*—Gloria Hale
(74) *Attorney, Agent, or Firm*—Fay Sharpe LLP; Karl W. Hauber

(57) ABSTRACT

An improved fishing wader uses light weight nylon faced laminate material and taped unsewn sonic welds to achieve a durable, light weight, comfortable wader.

16 Claims, 2 Drawing Sheets

WATERPROOF BREATHABLE FISHING WADER

BACKGROUND OF THE INVENTION

The present invention is broadly concerned with waders for use in fishing. More particularly, the disclosure pertains to waterproof breathable waders for use in fishing.

Waders are used by men and women while fishing. Fishermen, particularly fly fishermen, often walk to and in rivers and streams in pursuit of fish. Waders allow the fishermen to walk into the stream without getting their feet, legs and the garments under the wader wet. Waders are used in a variety of weather conditions. Thus, a fisherman may walk to a stream or along a stream when the air temperature is well above freezing and then enter the stream when the water temperature is close to freezing. The fisherman will often prefer to dress with sufficient layers to keep warm while in the stream. This may cause the fisherman to perspire when walking outside the stream. Waterproof breathable waders allow this perspiration to escape, helping to keep the fishermen comfortable.

Fishermen often travel to locations where they fish. Such travel may include a long car ride or airline travel on a vacation fishing trip. Therefore, the ability to pack gear and waders into a reasonable size for traveling can be important.

Waders are different from other clothing items, even "waterproof" clothing items. Wades are intended for fully immersed use for relatively extended periods. A fisherman may stand or wade in a stream in a depth of several feet for several hours. The waders are expected to withstand the pressure of the flowing water and keep the wearer's legs and feet dry. Conventional waterproof jackets are not expected to be immersed. Rather, they are expected to keep a wearer's trunk dry in rain. The pressure of immersion is not an expected condition.

Waterproof breathable waders have been commercially available for several years. Some of those waders comprise a trunk portion, two leg portions and two foot portions joined together at various seams to create a waterproof breathable wader. The foot portions can be stocking-like foot portions in a wader used with separate wading boots. The foot portions can be integral boots for use in what is called a boot foot wader without separate wading boots.

Such breathable waders are often constructed of laminate materials. Three-layer laminates comprising an outer layer of abrasion resistant woven material, a middle layer which is waterproof but breathable and an inner layer of knit material such as nylon tricot are popular. The outer layer is sometimes a dense (high thread count) polyester layer to provide durability. The middle layer is often expanded PTFE (polytetrafluoroethylene). The middle layer is sometimes a polyurethane waterproof breathable membrane. The inner layer is often woven nylon tricot. Other materials are sometimes used.

Waders are sometimes made of heavier material to increase durability. Waders are seamed in various ways including stitched seaming. The use of seam seals and seam tapes to avoid leaking is also common. There remains a need for a waterproof breathable wader which is durable, does not leak, is light weight, and packable.

SUMMARY OF THE INVENTION

A waterproof breathable fishing wader is provided which does not leak, which is sufficiently durable to be packed and unpacked multiple times and which is lightweight and comfortable. In accordance with the disclosure, the principle seams of the wader are not stitched seams but rather welded seams.

Still further in accordance with the invention, the wader is constructed of a three layer fabric comprising a light weight nylon outer layer, a waterproof breathable middle layer and a light weight nylon tricot inner layer.

Still further in accordance with the invention, the principle seams of the wader are welded seams in which edges are adjacently in contact but not overlapping one another.

Yet further in accordance with the invention, the middle layer is a polyurethane waterproof breathable membrane.

Still further in accordance with the invention, the seams of the wader are comprised of adjacent sections of the three layer wader material abutting one another sonically welded together. Seam tape is applied to one side of the seam.

DETAILED DESCRIPTION OF THE INVENTION

Figure 1:
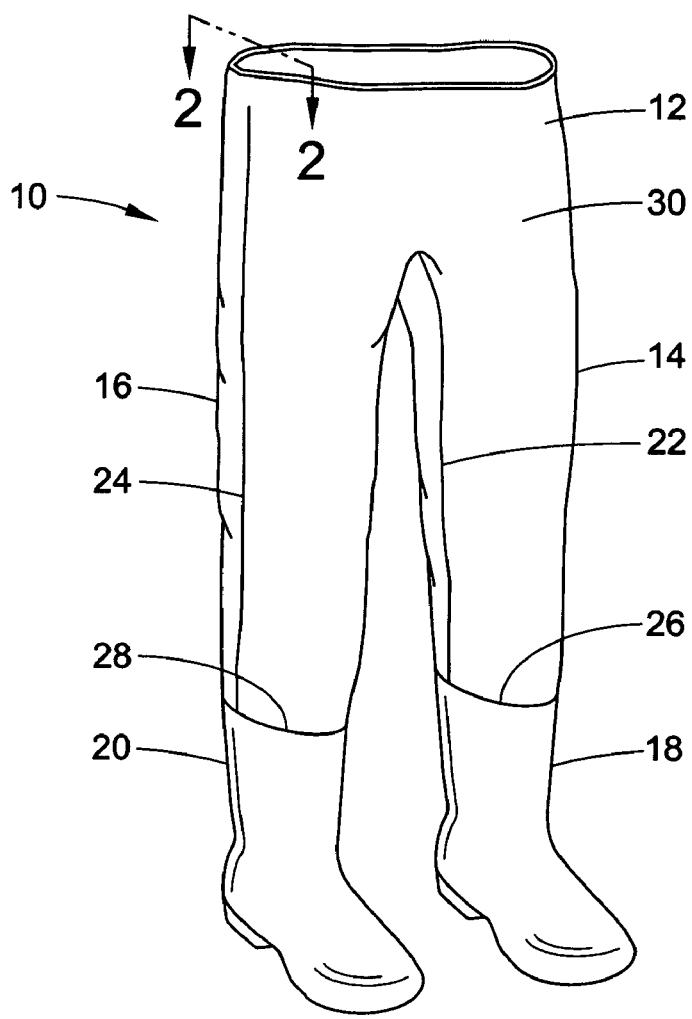
FIG. 1 is a schematic front elevational view of waders in accordance with the invention.

Fishing waders 10 as seen in FIG. 1 comprise a trunk portion 12, a left leg portion 14, a right leg portion 16, a left foot portion 18, and a right foot portion 20. The left foot portion 18 and the right foot portion 20 are sometimes stocking-like portions and are sometimes integrated boot portions.

One type of fishing wader is constructed from waterproof breathable material. In such waders, the trunk portion 12, the left leg portion 14 and the right leg portion 16 are often made of waterproof breathable laminate panels. The two foot portions 18 and 20 can sometimes be made of such waterproof breathable laminates but other times are made of either a different, non-breathable material or are boots. Various panels of waterproof breathable materials are joined together at seams to form the trunk portion 12, the left leg portion 14, and the right leg portion 16. A left leg seam 22 and a right leg seam 24 are shown in the leg portions of the wader 10. Additionally, a left foot seam 26 joins the bottom of the left leg portion 14 to the top of the left foot portion 18. Similarly, a right foot seam 28 joins the bottom of the right leg portion 16 to the top of the right foot portion 20.

Waders are often constructed with additional seams providing reinforcement at knees. Seams are sometimes added to join additional panels to alter fit. Seams are often added to join panels of different materials to accomplish different results in the waders. Pockets are sometimes added. Thus, seams are necessary to join panels to form waders.

Figure 2:
FIG. 2 is a cross-sectional view of the laminate used to form the panels of the waders seen in FIG. 1 taken along line 2-2.

The construction of the laminate material 30 used in the present invention to form the trunk portion 12, the left leg portion 14 and the right leg portion 16 is shown in FIG. 2. The laminate 30 is a three layer laminate. The outer layer 34 is a light weight nylon woven fabric. The middle layer 36 is a waterproof, breathable membrane. Such membranes are widely available commercially and are often fabricated from expanded polytetrafluoroethylene or polyurethane. The preferred middle layer is a waterproof breathable polyurethane membrane. The inner layer 38 is a light weight knitted nylon tricot. The preferred tricot is not coated.

This laminate material 30 is lighter and thinner than the laminate materials used in many waders. Many conventional waders use a thicker polyester outer layer.

Nylon generally has more stretch than polyester in a given application.

Figure 3:
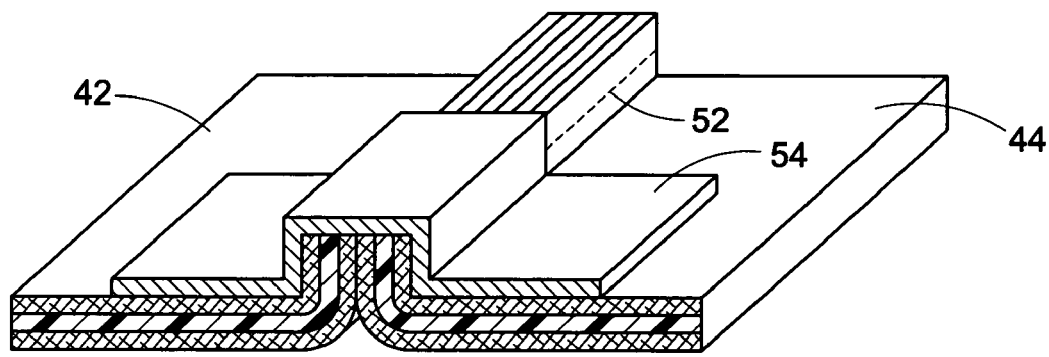
FIG. 3 is a cross-sectional view of a type of seam conventionally used to join panels of waders in the prior art.

In a conventional wader, many important seams are sewn and taped as seen in FIG. 3. Thus, two edges of a panel or edges of two separate panels 42, 44, are brought together and laid face to face. To create the seam seen in FIG. 3, two identical panels each having three layers, 46, 48, 50 are laid one on top of the other. The outer layer 46 of each panel is a polyester layer. The middle layer 48 of each panel is a breathable waterproof membrane and the inner layer 50 of each panel is a knitted nylon tricot. The two panels 42, 44 are sewn together at stitch line 52. The two panels are pulled away from one another. Adhesive seam tape 54 is then applied covering the edges of the panes where they are seamed together. A ridge of material in which the stitch line 52 resides is covered by the seam tape 54. The side of the panels 42, 44 opposite the seam tape 54 provides a conventional neat, clean seam appearance. The edges of the fabric are not abutted against one another in this seam. Rather, a portion of a face of panel 42 lies against a portion of a face of panel 44.

Figure 5:
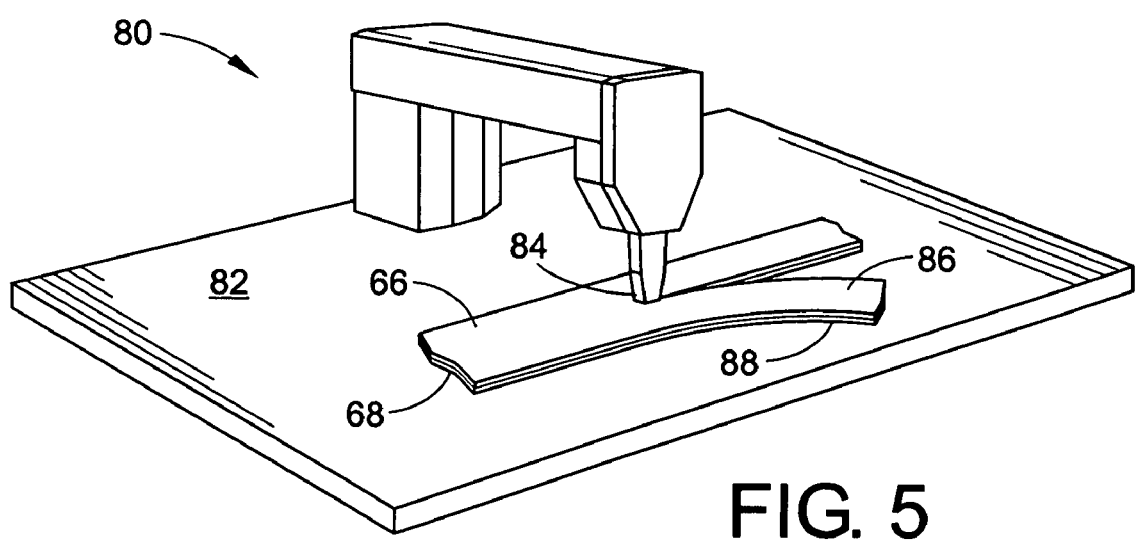

FIG. 5 shows the process of making the seam of the present invention. Two panels 66, 68 are laid, one on top of the other with the inner layers 38, 38 against one another on an ultrasonic joining machine 80. Such machines are commercially available from sources such as ARDMEL of Glenrothes, Fife, KY6 2SD in the United Kingdom (www.ardmel-group.co.uk). The stacked panels 66, 68 are supported on the machine table 82 and the proposed seam line moved through the ultrasonic welding gap 84. The two panels 66, 68 are continuously bonded together as they pass through the gap 84 and the portions 86, 88 of the panels 66, 68 on the "waste" side of the seam line are cut away. The panels are pulled away from one another. Adhesive seam tape 70 is then applied covering the ultrasonically joined seam.

Figure 4:
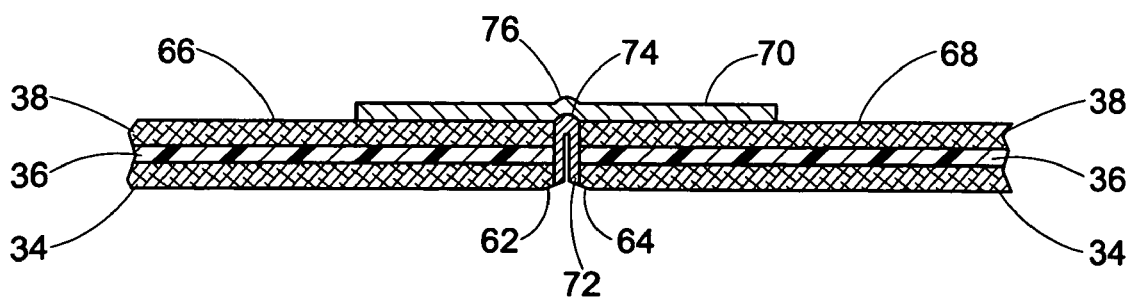
FIG. 4 is a cross-sectional view of a seam used to join the edges of panels in the wader of FIG. 1; and, FIG. 5 schematically shows the process creating a sonic welded seam.

FIG. 4 illustrates applicants' seam. A first panel edge 62 is adjacent and butted against a second panel edge 64. The two panel edges 62, 64 are either edges of the same panel (for example, to form the leg) or edges of different adjacent panels. The panels 66, 68 are each three layer panels having an outer layer 34, a middle layer 36, and an inner layer 38 as described above. Seam tape 70 overlays the inner face edges of the adjacent panel edges 62, 64. The adjacent edges of all three layers are joined together in a weld 72. The weld inner edge 74 extends lightly above the adjacent inner layers creating a slight ridge 76 in the seam tape 70. The weld 72 and seam tape 70 are sufficient to form a reliable waterproof seam without the overlap and stitching seen in prior art waders. Moreover, sufficient tensile strength is provided by the sonic weld 72 and seam tape 70 so that a durable, functional wader is provided.

Applicants have found that that use of nylon material rather than polyester aids in achieving a reliable welded seam. Applicants have found that using thinner layers aids in achieving a reliable welded seam.

This seaming technique allows the use of lighter weight, more flexible panels in forming waders. The panels do not need to have sufficient body to support a stitched seam. Rather, welding of adjacent nylon and polyurethane edges along with seam tape provides sufficient strength. Weight is saved through use of lighter weight panels and also through use of less material as overlapped seams are not required. A smoother more comfortable seam is also provided. It must be remembered that fishing waders are often worn in a fast flowing stream several feet deep. Wader may be pressed against the leg with considerable force. A thick bumpy seam may cause significant irritation. A smoother seam is less likely to irritate.

As described above, fishing waders are available in many different configurations including boot foot, stocking foot, waist high, chest high and with various configurations of reinforcing panels and pockets. The present invention provides improved functionality, increased comfort and lighter weight in a wader. Such advantages are particularly noticeable in a light weight packable stocking foot wader for use in traveling. However, the advantages and advances of the present invention are also useful in other fishing waders.

While the invention has been disclosed herein in connection with certain embodiments and detailed descriptions, it will be clear to one skilled in the art that modifications or variations of such details can be made without deviating from the gist of the invention and such modifications or variations or equivalents are considered to be within the scope of the claims hereinbelow.

What is claimed is:

1. A waterproof, breathable fishing wader comprising a trunk portion; a right leg portion; a left leg portion; a right foot portion; and, a left foot portion; the improvement comprising:
    said trunk portion and leg portions being constructed from waterproof breathable three layer laminated panels including an outer layer, a middle layer, and an inner layer;
    each of said outer, middle, and inner layers having planar surfaces and edges generally perpendicular to said layers planar surfaces;
    said inner layers generally parallel to the skin surface of a wearer when the wader is worn;
    a first three layer laminated panel and a second three layer laminated panel joined to one another at waterproof seams in which said edges of said three laminated edges of said first laminated panel and said three laminated edges of said second laminated panel are non-overlappingly butt joined to one another by an un-sewn, sonic weld wherein said outer, middle, and inner layer surfaces of the first and second laminated panels are in a coplanar orientation;
    said edges of at least said first three layer laminated panel and at least said second three layer laminated panel are non-folded, flat and butted against one another thus forming a fishing wader having minimal seam bulges; and,
    wherein said edges and said weld are reinforced to one another by seam tape overlaying portions of coplanar said laminated layers of said first and second three layer laminated panels on a surface of said inner layers of said three layer laminated panels and said weld therebetween.

2. The improved wader of claim 1 wherein said three layer laminated panels comprise a nylon outer layer, a waterproof breathable middle layer and a nylon said inner layer.

3. The improved wader of claim 2 wherein said middle layer is a polyurethane waterproof breathable membrane middle layer.

4. A waterproof, breathable fishing wader, comprising:
    a wader including at least a right leg portion and a left leg portion;
    said leg portions being constructed from waterproof breathable laminated panels;

a first said laminated panel having an inner layer and a second said laminated panel having an inner layer wherein said inner layers are contiguous to one another while said first and second panels are non-overlappingly joined to one another by an un-sewn, sonic weld thus forming a water proof edge;

said inner layer of said first panel separated from said inner layer of said second panel to a position non-folded and coplanar with said second panel thus forming a seam having a minimal bulge on an interior between edges of said first panel and said second panel, and no bulge on an exterior between edges of said first panel and said second panel;

said sonic weld overlaid by seam tape on an inner surface of said inner layer of said first laminated panel and an inner surface of said inner layer of said second laminated panel of said wader thereby providing said wader with increased tensile strength at said seam;

said laminated first and second panels each comprise a thin nylon outer layer, a thin waterproof breathable middle layer and a thin nylon said inner layer; and, said inner layers generally parallel to the skin surface of a wearer when the wader is worn and said edges generally perpendicular to said inner layers.

5. The improved wader of claim 4, wherein said middle layer is a polyurethane waterproof breathable membrane middle layer.

6. The improved wader of claim 4, wherein said bulge includes a weld inner edge extending slightly above the adjacent said inner layers of respective said first panel and said second panel.

7. The improved wader of claim 6, wherein said bulge extends towards the wearer.

8. The improved wader of claim 4, wherein at said seam an outer face of said outer layer of said first panel is coplanar with an outer face of said outer layer of said second panel.

9. The improved wader of claim 4, further comprising a trunk portion; a right foot portion; and, a left foot portion.

10. A method of constructing a waterproof wader including a waterproof seam, the method comprising:

overlaying a first laminated panel with a second laminated panel wherein the first and second panels are stacked including an inner layer of said first panel contiguous with an inner layer of said second panel;

moving said first and second panels through an ultrasonic welder forming a pliable waterproof seam wherein terminal ends of said first panel and terminal ends of said second panel are continuously bonded together as they pass through the welder;

creating a waste side of said first and second panels;

separating said inner layer of said first panel from said inner layer of said second panel and hingedly rotating said first panel and said second panel at said seam to a coplanar and unfolded orientation relative to one another; and, applying seam tape along said seam whereby said tape overlays a portion of an inner surface of said inner layer of said first panel, said seam, and a portion of an inner surface of said inner layer of said second panel thereby increasing the tensile strength at said seam.

11. The method according to claim 10, wherein the wader comprises a trunk portion; a right leg portion; a left leg portion; a right foot portion; and, a left foot portion.

12. The method according to claim 10, wherein each said laminated panel comprises a lightweight nylon outer layer, a lightweight waterproof breathable middle layer, and a lightweight nylon said inner layer.

13. The method according to claim 12, wherein said middle layer is a polyurethane waterproof breathable membrane middle layer.

14. The method according to claim 10, wherein at said seam an outer face of said outer layer of said first panel is coplanar with an outer face of said outer layer of said second panel.

15. The method according to claim 14, wherein respective said inner layers, said middle layers, and said outer layers of said first panel and said second panel are coplanar and non-folded with each other at said seam.

16. The method according to claim 15, wherein said weld forms a slight ridge between said inner layers at said pliable seam.

* * * * *